United States Patent [19]

Gauron

[11] Patent Number: 5,632,582

[45] Date of Patent: May 27, 1997

[54] INSET PANEL FASTENER WITH TWO-PART STEM

[76] Inventor: Richard F. Gauron, 9413 - 240th Ave. SE., Issaquah, Wash. 98027

[21] Appl. No.: 677,983

[22] Filed: Jul. 10, 1996

[51] Int. Cl.$^6$ ............................................. F16B 39/02
[52] U.S. Cl. ............................ 411/82; 411/258; 411/108; 52/787.1
[58] Field of Search ..................... 411/82, 258, 111, 411/112, 113, 108, 180, 930; 52/787.1, 787.11, 787.12

[56] References Cited

U.S. PATENT DOCUMENTS

| | | |
|---|---|---|
| 2,235,078 | 3/1941 | Meisterhans . |
| 3,019,865 | 2/1962 | Rohe . |
| 3,313,078 | 4/1967 | Rohe . |
| 3,339,609 | 9/1967 | Cushman . |
| 3,504,723 | 4/1970 | Cushman et al. . |
| 3,621,557 | 11/1971 | Cushman et al. . |
| 3,646,981 | 3/1972 | Barnes . |
| 3,646,982 | 3/1972 | Cushman . |
| 3,662,805 | 5/1972 | Sygnator . |
| 3,695,324 | 10/1972 | Gulistan . |
| 3,964,531 | 6/1976 | Schenk . |
| 4,185,438 | 1/1980 | Fischer ............................ 411/82 |
| 4,227,561 | 10/1980 | Molina . |
| 4,341,053 | 7/1982 | Dettfurth et al. . |
| 4,417,028 | 11/1983 | Azevedo . |
| 4,428,705 | 1/1984 | Gelhard ............................ 441/82 |
| 4,509,308 | 4/1985 | Dettfurth ......................... 52/787.1 |
| 4,812,193 | 3/1989 | Gauron . |
| 4,846,612 | 7/1989 | Worthing ........................ 411/258 |
| 4,973,208 | 11/1990 | Gauron ............................ 411/82 |
| 5,082,405 | 1/1992 | Witten ............................. 411/82 |
| 5,378,099 | 1/1995 | Gauron ............................ 411/82 |

Primary Examiner—Flemming Saether
Attorney, Agent, or Firm—Joan H. Pauly

[57] ABSTRACT

A fastener element (2) has first and second body portions (4, 6) that are mechanically interlocked. The first body portion (4) has an integral outer end disk (20) with a flat outer radial surface (26). The second body portion (6) has circumferentially spaced legs (48) that extend along chordal surfaces (28) on the first body portion (4) and terminate axially inwardly of the disk (20). The legs (48) interlock with projections (30) on the surfaces (28). The legs are tapered to direct binding material from a fill opening into flow passageways and then toward a vent opening during a molding-in procedure to install the element (2) in a structure.

14 Claims, 2 Drawing Sheets

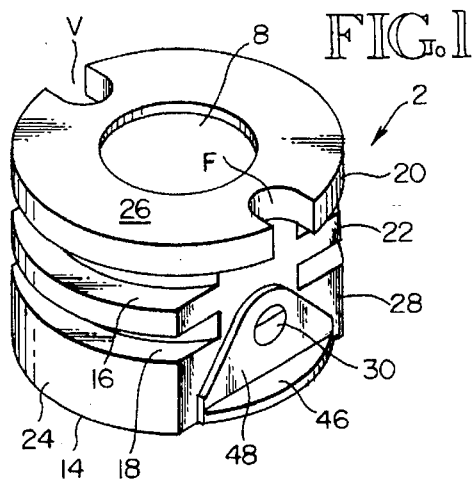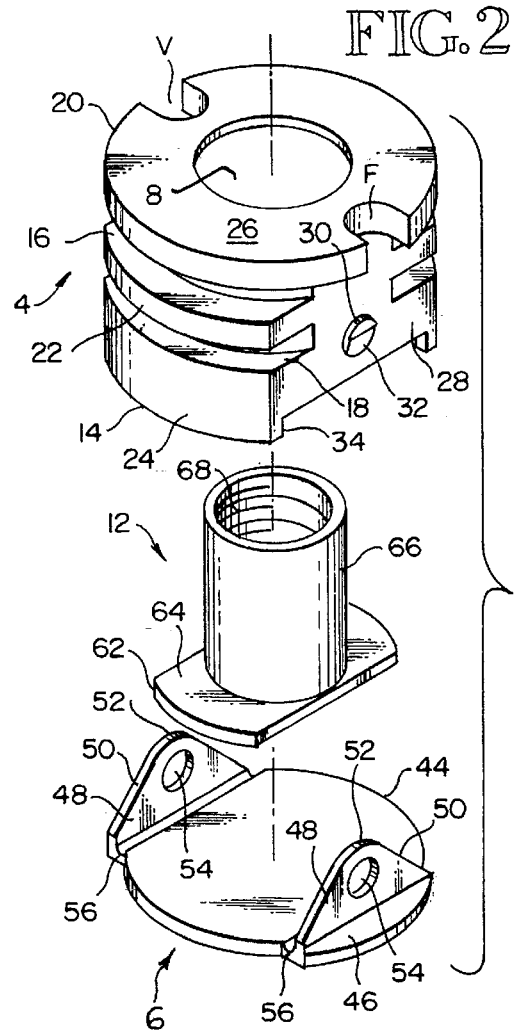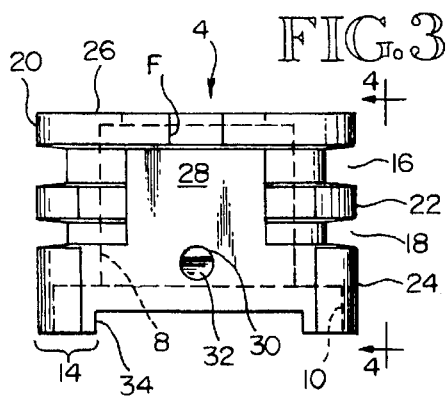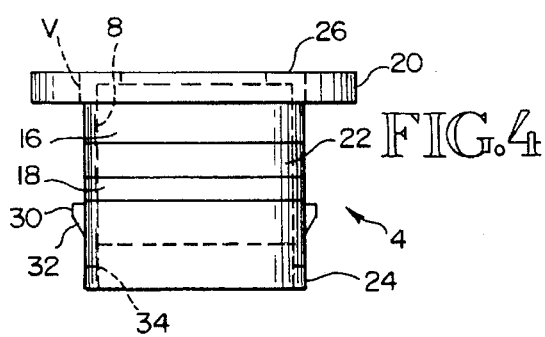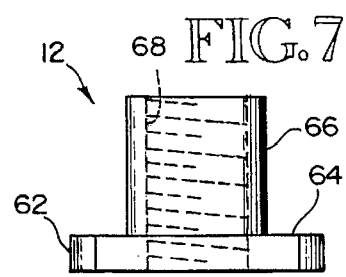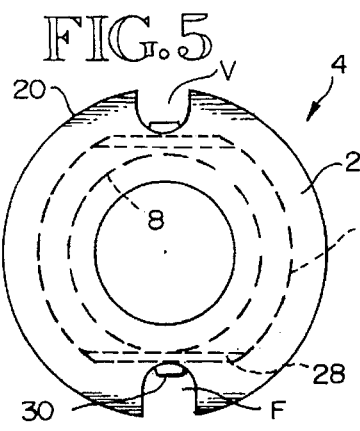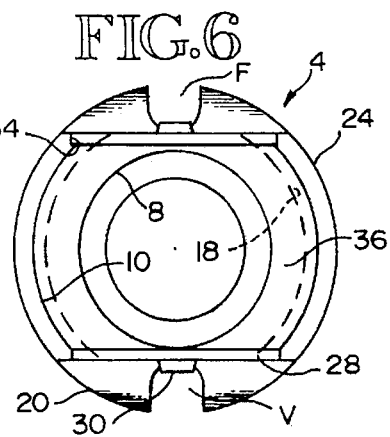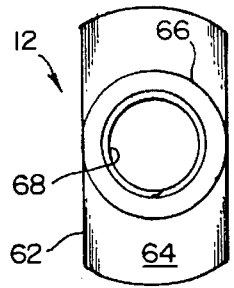

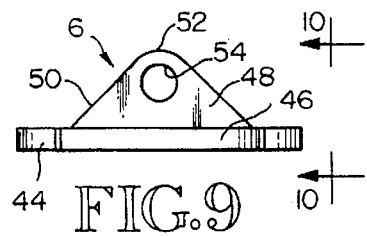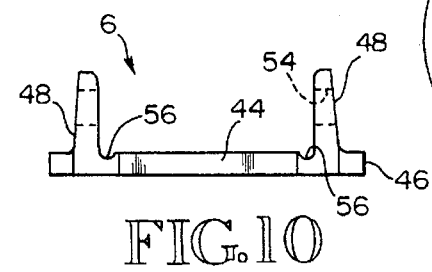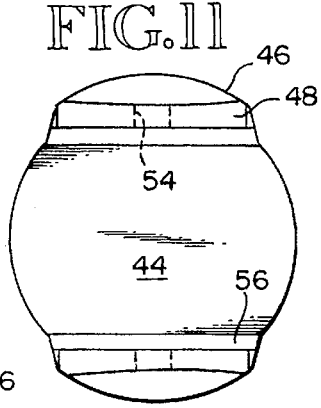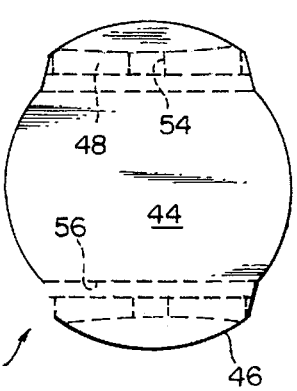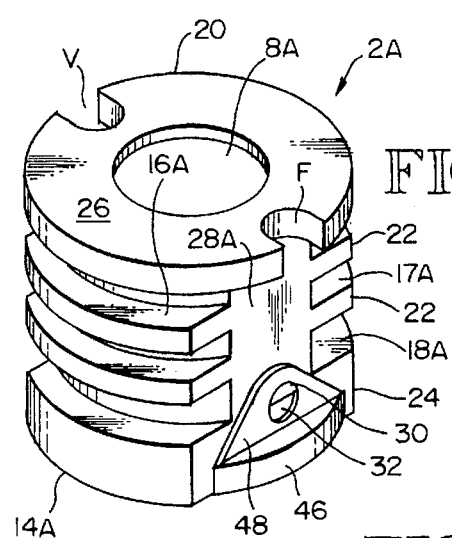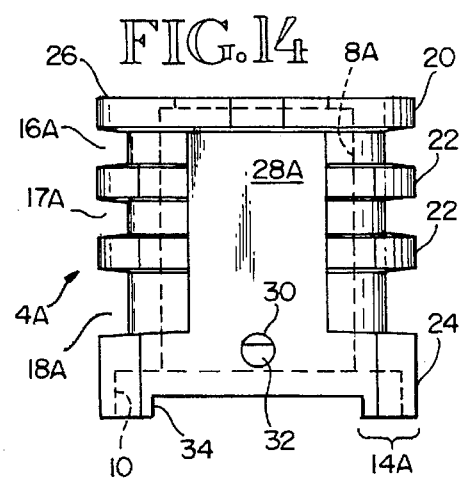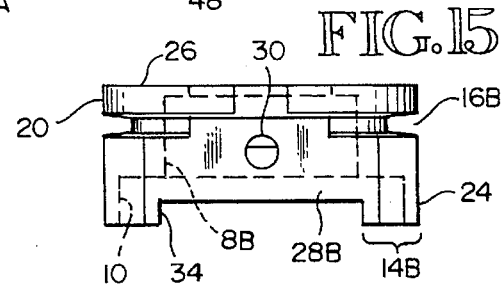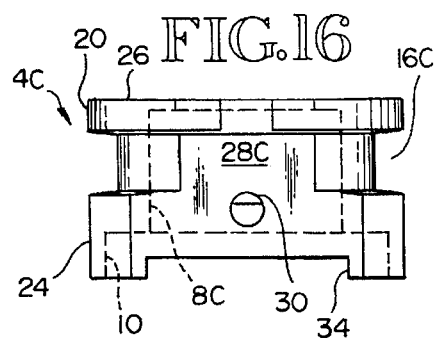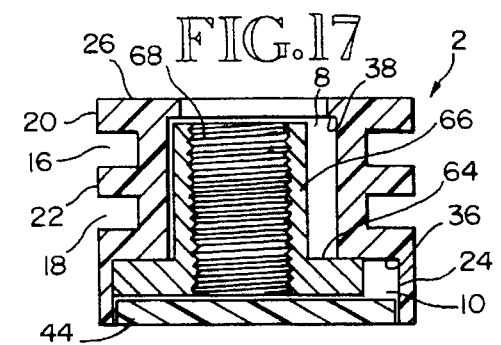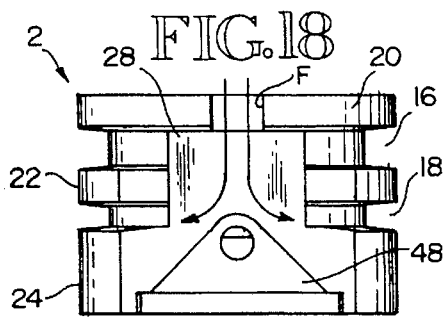

INSET PANEL FASTENER WITH TWO-PART STEM

TECHNICAL FIELD

This invention relates to inset fastener elements and, more particularly, to such an element having first and second stem portions that mechanically interlock. The second stem portion includes axially extending legs that terminate axially inwardly of an outer end disk that is integral with the first stem portion.

BACKGROUND INFORMATION

Inset-type fastener elements are useful for connecting various types of structures to other structures or objects. An inset fastener element is generally anchored into a structure and has an engagement portion to which a screw fastener or the like is secured in order to connect an object to the structure. This arrangement is particularly advantageous when a strong connection between the structure and the object cannot readily be obtained by securing the fastener directly to the structure without an intervening fastener element.

Sandwich panels of the type used extensively in the aircraft and marine industries are one type of structure which is commonly connected to other structures or objects by use of inset fastener elements. In order to provide a secure anchor in the cellular honeycomb core of the panel, the inset fastener element is molded into a cavity formed in the core by use of a binding (potting) material. Since it is difficult to precisely align the fastener element with the fastener receiving hole or other engagement means in the object or structure to be connected to the panel, some fastener elements are provided with floating members that automatically adjust for misalignments. One example of a fastener element with a floating member is disclosed in my U.S. Pat. No. 5,378,099, granted Jan. 3, 1995. The present invention is directed toward improvements in the type of fastener element disclosed in my previous patent.

DISCLOSURE OF THE INVENTION

The invention relates to a fastener element designed for molded-in installation, by use of a binding material, into a cavity in a structure. The fastener element is receivable into the cavity and adapted to cooperate with a screw fastener or the like to connect an object to the structure.

According to an aspect of the invention, the fastener element comprises a body having first and second portions and a floating member. The second body portion is mechanically interlocked with the first portion. The first portion includes an integral outer end disk having a fill opening and a vent opening extending through diametrically opposite peripheral portions thereof. It also includes a first stem portion formed integrally with and extending inwardly from the disk. The second body portion includes a second stem portion mechanically interlocked with the first stem portion to mechanically interlock the first and second body portions. The first and second stem portions together form a stem. The first and second body portions together define an axial opening that has an outer end opening onto an outer radial surface of the disk. The axial opening extends inwardly from the outer end into the stem. The body has an axially inwardly facing radial shoulder. The first stem portion includes two circumferentially spaced sections that form flow passageways around the stem, reduced diameter axial surfaces positioned circumferentially between the sections and radially inwardly of the fill opening and the vent opening, respectively, and first interlock portions carried by axially inner portions of the axial surfaces. The second stem portion includes circumferentially spaced legs and second interlock portions. The legs are positioned and dimensioned to extend axially outwardly along the axial surfaces of the first stem portion and to terminate axially inwardly of the disk. The second interlock portions are carried by the legs and are positioned to interlock with the first interlock portions to mechanically interlock the first and second body portions. The floating member is positioned in the axial opening. The floating member includes an engagement portion aligned with the outer end of the axial opening for engaging a fastener. A radial surface of the floating member is positioned to engage the body's radial shoulder to transmit forces therebetween and to retain the member in the axial opening. The member and the axial opening are shaped and dimensioned to substantially prevent rotation of the member in the axial opening while permitting radial movement of the member in the axial opening to automatically adjust for misalignments between the structure and the object. The first and second stem portions and the disk cooperate to exclude binding material from the axial opening to prevent hindrance of radial movement by the material.

The configurations of the axial surfaces, legs, and interlock portions may be varied. Preferably, both the axial surfaces and the legs are substantially flat. Each leg has a radial hole extending therethrough. The first interlock portions comprise radial projections positioned to be received into the radial holes. In the preferred embodiment, each of the radial projections has an axially inner tapered portion to help guide the projections into the radial holes. Whatever the configurations of the axial surfaces, legs, and interlock portions, the legs are preferably sufficiently flexible to allow the stem portions to be snap fit together.

According to another aspect of the invention, the fastener element comprises a body including an outer end disk and a stem. The outer end disk has a fill opening and a vent opening extending through diametrically opposite peripheral portions thereof. The stem extends inwardly from the disk. The body defines an axial opening that has an outer end opening onto an outer radial surface of the disk and that extends inwardly from the outer end into the stem to receive a fastener. The stem includes two circumferentially spaced sections that form flow passageways around the stem, reduced diameter axial surfaces positioned circumferentially between the sections and radially inwardly of the fill opening and the vent opening, respectively, and circumferentially spaced legs. The legs extend axially outwardly along the axial surfaces and terminate at outer ends positioned axially inward of the disk. The outer ends of the legs are at least partially aligned with the fill opening and the vent opening, respectively. The legs taper toward the outer ends so that binding material will be directed by the legs from the fill opening into the flow passageways and from the flow passageways toward the vent opening.

Preferably, the axial surfaces are substantially flat, and the legs are substantially flat and have sloping edge surfaces. The edge surfaces are preferably curved at the outer ends of the legs. The stem may comprise first and second interlocking stem portions, as described above.

The fastener element of the invention offers a number of advantages. The integral outer end disk of the fastener element helps to ensure that potting material is excluded from the axial opening during the procedure in which the fastener element is installed in a panel or other structure. The integral disk has a continuous outer radial surface that can be made essentially flat and even. This promotes essentially continuous contact between the outer radial surface and a positioning tab used in the type of installation process described in my U.S. Pat. No. 5,378,099. The continuous contact prevents potting material from oozing between the disk and the positioning tab from the fill opening or vent opening to the axial opening as the potting material is being introduced into the cavity in the structure to install the fastener element. The desirability of excluding potting material from the axial opening is obvious since potting material in the axial opening would tend to hinder radial movement of a floating member positioned in the axial opening. In embodiments not having a floating member, potting material in the axial opening could interfere with engagement of a fastener in the axial opening.

The structure of the stem legs also offers advantages. In a system of fastener elements that includes a plurality of elements having two-part bodies and differing in the axial lengths of the overall elements, the leg structure allows the number of parts in the system to be minimized. Because the legs on one stem portion terminate axially inwardly of the disk on the other stem portion, a single part may provide the second stem portion for a plurality of fastener element sizes. The first interlock portions can be a constant distance from the axially inner end of the first stem portion but vary in position relative to the outer end disk. This allows the legs on a second stem portion having constant dimensions to be interlocked with first stem portions having a variety of axial lengths to produce fastener elements having a variety of axial lengths. In addition to allowing the number of parts in a system to be minimized, the leg structure also provides improved flow patterns around the fastener element whether the element has a two-part or a one-part body.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a pictorial view of an intermediate size of the preferred embodiment of the fastener element of the invention, with the parts of the element shown assembled together.

FIG. 2 is an exploded pictorial view of the fastener element shown in FIG. 1.

FIG. 3 is an elevational view of the first body portion shown in FIGS. 1 and 2.

FIG. 4 is an elevational view taken along the line 4—4 in FIG. 3.

FIGS. 5 and 6 are top and bottom plan views, respectively, of the body portion shown in FIGS. 3 and 4.

FIG. 7 is an elevational view of the floating member shown in FIG. 2.

FIG. 8 is a top plan view of the floating member shown in FIG. 7.

FIG. 9 is an elevational view of the second body portion shown in FIGS. 1 and 2.

FIG. 10 is an elevational view taken along the line 10—10 in FIG. 9.

FIGS. 11 and 12 are top and bottom plan views, respectively, of the body portion shown in FIGS. 9 and 10.

FIG. 13 is like FIG. 1 except that it shows a different size fastener element having a greater axial extent.

FIG. 14 is an elevational view of the first body portion shown in FIG. 13.

FIGS. 15 and 16 are elevational views of the first body portions of two smaller size fastener elements of the preferred embodiment.

FIG. 17 is a sectional view of the fastener element shown in FIG. 1.

FIG. 18 is an elevational view of the assembled fastener element shown in FIG. 1 illustrating the flow pattern of binding material introduced through the fill opening and encountering one of the stem legs.

BEST MODE FOR CARRYING OUT THE INVENTION

The drawings show a fastener element that is constructed according to the invention and that constitutes the best mode for carrying out the invention currently known to the applicant. All of the drawing figures show the embodiment of the invention that is currently the preferred embodiment. However, various sizes of the preferred embodiment are shown. FIGS. 1–12, 17, and 18 show an intermediate size fastener element 2. FIGS. 13 and 14 show a larger fastener element 2A that has a greater axial extent. FIGS. 15 and 16 show the first body portion of two smaller size fastener elements having lesser axial extents. Each size of the preferred embodiment includes a two-part body and a floating member. However, a one-part fastener element could also be provided without departing from the spirit and scope of the invention.

Referring to FIGS. 1–12, 17, and 18, the fastener element 2 shown therein includes a first body portion 4, a second body portion 6, and a T-shaped floating member 12. An axial opening 8, 10 is defined by the first and second body portions 4, 6. In the assembled fastener element 2, the floating member 12 is positioned in the axial opening 8, 10. The first and second body portions 4, 6 have first and second stem portions, respectively, that together form a stem in the assembled element 2.

The first body portion 4 is shown in FIGS. 1–6, 17, and 18. Referring to those figures, the first body portion 4 has an integral outer end disk 20. The first stem portion is formed integrally with and extends axially inwardly from the disk 20. A vent opening V and a fill opening F extend through diametrically opposite peripheral portions of the disk 20. The stem portion includes two circumferentially spaced sections 14 that form flow passageways 16, 18 around the stem. The axially outer flow passageway 16 of each section 14 is formed between the outer end disk 20 and an intermediate disk segment 22. The inner flow passageway 18 is formed between the intermediate disk segment 22 and an inner disk segment 24. The intermediate disk segment 22 has substantially the same thickness as the outer end disk 20. The inner disk segment 24 is relatively thick in the axial direction. The cylindrical axially outer portion 8 of the axial opening 8, 10 opens onto the outer radial surface 26 of the outer end disk 20. As can be seen in FIG. 17, the opening through the disk 20 has a slightly reduced diameter so that a small axially inwardly facing radial shoulder 38 is formed by the disk 20 in the axial opening 8, 10.

The stem portion of the first body portion 4 has reduced diameter axial surfaces 28 positioned circumferentially between the sections 14. As shown, in the preferred embodiment, the axial surfaces 28 are formed by substantially flat chordal walls. The chordal surfaces 28 are positioned radially inwardly of the fill opening F and vent opening V, respectively. A radial projection 30 projects radially outwardly from each of the chordal surfaces 28. As best seen in FIGS. 3 and 4, the projection 30 is positioned so that its axially outer edge is substantially aligned with the axially outer edges of the inner disk segments 24. The projection 30 is generally a partially tapered flat round disk. The upper about ⅓ of the disk is flat and has an outer surface essentially parallel to the chordal surface 28. Axially inwardly of the flat portion, the projection 30 has a tapered portion 32 that tapers radially and axially inwardly toward the chordal surface 28. This tapering of the projection 30 assists in assembly of the fastener element 2, as described further below.

The axially inner end of each chordal wall 28 has a rectangular cutout 34, best seen in FIGS. 2 and 3. Referring to FIGS. 3, 6, and 17, the inner end 10 of the axial opening 8, 10 is formed by an enlarged bottom recess in the first body portion 4. The width of the opening portion 10 is defined between the chordal walls 28 and is essentially equal to the diameter of the cylindrical outer axial opening portion 8. The dimension of the opening portion 10 perpendicular to this width is enlarged to accommodate the head of the T-shaped floating member 12. The enlargement of this dimension is permitted by the thick inner disk segments 24. The recessed bottom of the first body portion 4 forms an axially inwardly facing radial shoulder 36 at the interface of the two portions 8, 10 of the axial opening.

Referring to FIGS. 1, 2, 9–12, 17, and 18, the second body portion 6 includes a flat bottom wall 44 with a circular center portion and diametrically opposite radial extensions 46. The radial extensions 46 have a radius of curvature substantially equal to the radius of curvature of the outer end disk 20 and disk segments 22, 24 of the first body portion 4. The second body portion 6 also includes a pair of circumferentially spaced legs 48. The legs 48 are positioned opposite and parallel to each other and are dimensioned to extend axially outwardly along the chordal surfaces 28 of the first body portion 4 in the assembled fastener element 2. The legs 48 are formed integrally with the bottom 44 and extend axially outwardly from the radial extensions 46. Each leg 48 is substantially flat with a generally triangular periphery. The leg 48 tapers axially outwardly from the corresponding radial extension and terminates at an outer end which is axially inward of the outer end disk 20 in the assembled fastener element 2. The edge of the leg 48, between the inner face that abuts the corresponding chordal surface 28 and the outer face, has opposite sloping sides 50 that slope toward each other as they extend axially outwardly. The outer end 52 of the edge surface is curved so that the leg 48 forms a triangle with a curved apex. A radial hole 54 extends through a center portion of the leg 48. A chordal groove 56 is formed in the bottom wall 44 at the base of each leg 48 radially inward of the leg 48.

Referring to FIGS. 2, 7, 8, and 17, the T-shaped floating member 12 has a flat oblong head 62 with an outer radial surface 64, and a cylindrical portion 66 that extends from the head 62 opposite the radial surface 64. A threaded center axial opening 68 extends through the floating member 12. The opening 68 is coaxial with the cylindrical portion 66 and, in the assembled element 2, is aligned with the outer end of the axial opening 8, 10 to receive a screw fastener or the like to connect an object to a structure in which the element is installed. The floating member 12 is preferably made from metal to maximize its effectiveness in engaging a screw fastener. The body portions 4, 6 of the fastener element 2 are preferably made from molded plastic.

In the assembly of the fastener element 2, the floating member 12 is placed in the axial opening 8, 10 of the first body portion 4. The cylindrical portion 66 of the member 12 is received into the cylindrical portion 8 of the axial opening, and the head 62 is received into the enlarged portion 10. The T-shape of the member 12 and the axial opening 8, 10 and the dimensioning of the opening 8, 10 and member 12 are such that rotation of the member 12 in the opening 8, 10 is substantially prevented while radial movement of the member 12 in the opening 8, 10 is permitted. The prevention of rotation facilitates engagement of the member 12 by a fastener. The radial movement automatically adjusts for misalignments between the structure in which the fastener element 2 is installed and object being connected to the structure.

After the member 12 has been placed in the opening 8, 10, the two body portions 4, 6 are assembled together by placing the legs 48 of the second portion 6 adjacent to the chordal surfaces 28 and pushing the second portion 6 toward the first portion 4 to snap fit the two portions 4, 6 together. The legs 48 are sufficiently flexible to allow the snap-fit engagement of the two portions 4, 6. The outer ends of the legs 48 slide along the tapered portions 32 of the radial projections 30 on the chordal surfaces 28, and the projections 30 snap into the radial holes 54 in the legs 48 to mechanically interlock the two body portions 4, 6.

With the fastener element 2 thus assembled, the circular center portion of the bottom 44 of the second body portion 6 fits inside the recessed bottom of the first body portion 4. The radial projections 46 extend radially outwardly through the cutouts 34 in the chordal walls 28. The second body portion 6 forms a second stem portion that cooperates with the first stem portion of the first body portion 4 to form the stem of the assembled fastener element 2. The two body portions 4, 6 cooperate to define the axial opening 8, 10 with the bottom 44 of the second body portion 6 closing off the bottom or axially inner end of the opening 8, 10.

As in the fastener element disclosed in my previous U.S. Pat. No. 5,378,099, the two body portions 4, 6 cooperate to exclude binding material from the opening 8, 10. This maintains the capability for radial movement of the floating member 12 in the opening 8, 10. In order to ensure the exclusion of binding material, the interface between the two body portions 4, 6 is preferably sealed by an adhesive. Prior to snapping the second body portion 6 onto the first body portion 4, adhesive is positioned around the inner circumferential surface of each inner disk segment 24 of the first body portion 4 and/or on the circumferential edges of the center portion of the bottom 44 of the second body portion 6. Adhesive is also positioned in the grooves 56 on the second body portion 6. This seals the interface of the body portions 4, 6. In addition to providing space for the adhesive, the grooves 56 serve to accommodate irregularities in the bottoms of the chordal walls 28 to ensure a tight fit between the two body portions 4, 6.

The assembled fastener 2 is installed in a structure by means of a molding-in procedure in a known manner. This procedure is described in detail in my previous U.S. Pat. No. 5,378,099. As noted above, the integral forming of the outer end disk 20 so that the outer end disk 20 has a continuous outer radial surface 26 helps ensure that potting material does not enter the axial opening 8, 10 through the outer end thereof during the molding-in procedure. The continuous flat surface 26 forms a continuous or essentially continuous abutting interface with the positioning tab that is used in the procedure to assist in handling and positioning the fastener element 2 in a cavity in the structure, as described in my above-cited prior patent. This prevents oozing of potting material between the tab and surface 26 during the molding-in procedure.

The positioning and configuration of the legs 48 contribute to ensuring a proper flow path of the potting material around the fastener element 2. This function is illustrated in FIG. 18. Inflowing potting material flows downwardly toward the leg 48 that is aligned with the fill opening F. The rounded outer end 52 and sloping sides 50 of the leg 48 direct the potting material into the flow passageways 16, 18. The potting material flows around the fastener element 2 and encounters the opposite leg 48 aligned with the vent opening V. On the opposite side, the tapered leg 48 directs the potting material toward the vent opening V.

The fastener element shown in FIGS. 1–12, 17, 18 and described above is part of a system of fastener elements that is designed to minimize the total number of parts in the system. The system includes fastener elements of various sizes, with the sizes having differing axial extents. Regardless of the size, each fastener element in the system has a pair of opposite inner disk segments 24 and radial projections 30, as described above. Thus, for each size of the fastener element, the same part may be used as the second body portion 6. The different sizes of fastener elements differ only in the axial extent of their first body portions and the cylindrical portions 66 of the corresponding floating members. Regardless of the axial extent of the first body portion, the legs 48 of the second body portion 6 function to mechanically interlock the two body portions and to direct flow of potting material, as described above.

FIGS. 13 and 14 illustrate a fastener element 2A with a relatively large axial extent larger than the axial extent of the fastener element 2 shown in FIGS. 1–12, 17, and 18. The first body portion 4A of the element 2A has an outer end disk 20 and inner disk segments 24 like the element 2 described above. However, there are two pairs of intermediate disk segments 22 rather than a single pair as in element 2. Three flow passageways 16A, 17A, 18A are formed around each arcuate section 14A of the body portion 4A. Because of the greater axial extent of the body portion 4A, the cylindrical portion 8A of the axial opening is longer and the chordal surfaces 28A have a greater axial extent than in the fastener element 2. Otherwise, the two fastener elements 2, 2A are essentially the same and both function in the manner described above.

Each of FIGS. 15 and 16 illustrates still another size of the first body portion of the preferred embodiment of the fastener element. FIG. 15 shows a first body portion 4B with a minimal axial extent. In this body portion 4B, each arcuate section 14B lacks an intermediate disk segment and has a single flow passageway 16B. The cylindrical portion 8B of the axial opening and the axially outer portions of the chordal surfaces 28B are correspondingly shorter. The first body portion 4C shown in FIG. 16 is similar to that shown in FIG. 15 except that the flow passageway 16C is axially deeper than the flow passageway 16B to provide a greater overall axial extent of the body portion 4C. The difference in axial extent is reflected in a corresponding difference in the axial extents of the cylindrical portion of the axial opening 8C and the chordal surfaces 28C.

The fastener element body portions shown in FIGS. 3 and 14–16, are only some examples of the various sizes that may be provided consistently with the scope of the invention and as part of the preferred embodiment of the invention. Whatever the size of the first body portion, it can be snap fit together with the second body portion 6 shown in the drawings and described above to produce the desired size fastener element. The result is a system of fastener elements with as many sizes but fewer parts than previous fastener element systems. The fewer number of parts results in savings in the cost of manufacture and maintenance of inventory.

In most situations, it is desirable that the floating member positioned inside the fastener element body have as great an axial length as possible in order to maximize the extent of threaded engagement between the floating member and a screw fastener. However, it would be possible to use a shorter floating member in a larger size fastener element. For example, the floating member 12 shown in FIGS. 2, 7, 8, and 17 could be used in the fastener element 2A shown in FIG. 13.

FIG. 17 shows the optimal fit between the floating member 12 and the fastener element body 4, 6. The head 62 of the floating member 12 is received in the enlarged inner portion 10 of the axial opening. The radial surface 64 of the head 62 abuts the shoulder 36 formed by the body portion 4 to transmit fastener loads therebetween and to retain the floating member 12 in the axial opening 8, 10. The outer end of the shaft 66 of the floating member 12 is adjacent to but slightly spaced from the upper shoulder 38. The spacing ensures that the loads are transmitted to the inner shoulder 36 so that the entire body portion 4 carries the loads. The efficient transfer of loads to the body portion 4 is also facilitated by the orientation of the floating member 12 to position its head 62 at the axially inner end of the element 2. However, this preferred orientation and the preferred arrangement illustrated in FIG. 17 are not a part of the present invention. Other floating member orientations and/or force transmission arrangements could be provided without departing from the spirit and scope of the invention.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. For molded-in installation, by use of a binding material, into a cavity in a structure, a fastener element receivable into the cavity and adapted to cooperate with a screw fastener or the like to connect an object to the structure, said fastener element comprising:

a body including a first portion, and a second portion mechanically interlocked with said first portion; said first portion including an integral outer end disk having a fill opening and a vent opening extending through diametrically opposite peripheral portions thereof, and a first stem portion formed integrally with and extending inwardly from said disk; said second portion including a second stem portion mechanically interlocked with said first stem portion to mechanically interlock said first and second portions of said body; said first and second stem portions together forming a stem; said first and second portions of said body together defining an axial opening that has an outer end opening onto an outer radial surface of said disk and that extends inwardly from said outer end into said stem; and said body having an axially inwardly facing radial shoulder;

said first stem portion including two circumferentially spaced sections that form flow passageways around the stem, reduced diameter axial surfaces positioned circumferentially between said sections and radially inwardly of the fill opening and the vent opening, respectively, and first interlock portions carried by axially inner portions of said axial surfaces; said second stem portion including circumferentially spaced legs positioned and dimensioned to extend axially outwardly along said axial surfaces and to terminate axially inwardly of said disk, and second interlock portions carried by said legs and positioned to interlock with said first interlock portions to mechanically interlock said first and second body portions; and a floating member positioned in said axial opening; said member including an engagement portion aligned with said outer end of said axial opening for engaging a fastener, and a radial surface positioned to engage said shoulder to transmit forces therebetween and to retain said member in said axial opening;

said floating member and said axial opening being shaped and dimensioned to substantially prevent rotation of said member in said axial opening while permitting radial movement of said member in said axial opening to automatically adjust for misalignments between the structure and said object; and said first and second stem portions and said disk cooperating to exclude binding material from said axial opening to prevent hindrance of said radial movement by said material.

2. The fastener element of claim 1, in which said axial surfaces are substantially flat, each said leg is substantially flat and has a radial hole extending therethrough, and said first interlock portions comprise radial projections positioned to be received into said radial holes.

3. The fastener element of claim 2, in which said legs are sufficiently flexible to allow said stem portions to be snap fit together.

4. The fastener element of claim 3, in which each of said radial projections has an axially inner tapered portion to help guide said projections into said radial holes.

5. The fastener element of claim 3, in which said legs taper axially outwardly so that binding material will be directed by said legs from said fill opening into said flow passageways and from said flow passageways toward said vent opening.

6. The fastener element of claim 2, in which each of said radial projections has an axially inner tapered portion to help guide said projections into said radial holes.

7. The fastener element of claim 2, in which said legs taper axially outwardly so that binding material will be directed by said legs from said fill opening into said flow passageways and from said flow passageways toward said vent opening.

8. The fastener element of claim 1, in which said legs taper axially outwardly so that binding material will be directed by said legs from said fill opening into said flow passageways and from said flow passageways toward said vent opening.

9. For molded-in installation, by use of a binding material, into a cavity in a structure, a fastener element receivable into the cavity and adapted to cooperate with a screw fastener or the like to connect an object to the structure, said fastener element comprising:

a body including an outer end disk having a fill opening and a vent opening extending through diametrically opposite peripheral portions thereof, and a stem extending inwardly from said disk; said body defining an axial opening that has an outer end opening onto an outer radial surface of said disk and that extends inwardly from said outer end into said stem to receive a fastener;

said stem including two circumferentially spaced substantially cylindrical sections that form flow passageways around the stem, reduced diameter generally flat axial surfaces positioned circumferentially between said sections and radially inwardly of the fill opening and the vent opening, respectively, and circumferentially spaced legs extending axially outwardly along said axial surfaces and terminating at outer ends positioned axially inward of said disk, said outer ends of said legs being at least partially aligned with the fill opening and the vent opening, respectively, and said legs tapering toward said outer ends so that binding material will be directed by said legs from the fill opening into said flow passageways and from said flow passageways toward the vent opening.

10. The fastener element of claim 9, in which said axial surfaces are substantially flat, and said legs are substantially flat and have sloping edge surfaces.

11. The fastener element of claim 10, in which said edge surfaces are curved at said outer ends.

12. The fastener element of claim 11, in which said stem comprises a first stem portion including said axial surfaces, a second stem portion including said legs, and interlocking portions carried by said axial surfaces and said legs, respectively, for mechanically interlocking said first and second stem portions.

13. The fastener element of claim 10, in which said stem comprises a first stem portion including said axial surfaces, a second stem portion including said legs, and interlocking portions carried by said axial surfaces and said legs, respectively, for mechanically interlocking said first and second stem portions.

14. The fastener element of claim 9, in which said stem comprises a first stem portion including said axial surfaces, a second stem portion including said legs, and interlocking portions carried by said axial surfaces and said legs, respectively, for mechanically interlocking said first and second stem portions.

* * * * *